May 6, 1952  J. JOHNSTON ET AL  2,595,385
FLUID FLOWMETER
Filed July 12, 1945
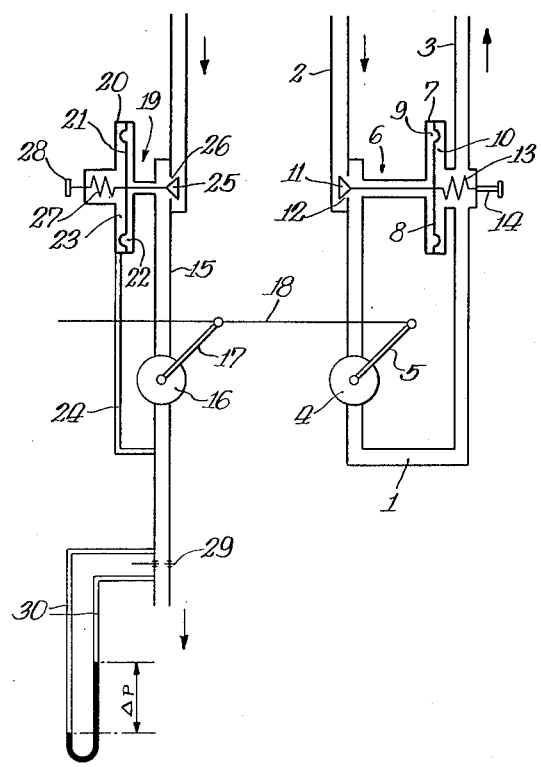
INVENTORS.
Jesse Johnston,
John C. Vaaler, Patented May 6, 1952

2,595,385

UNITED STATES PATENT OFFICE 2,595,385

FLUID FLOWMETER

Jesse Johnston, Middletown, Ohio, and John C. Vaaler, Libertyville, Ill., assignors to Askania Regulator Company, Chicago, Ill., a corporation of Illinois Application July 12, 1945, Serial No. 604,543

7 Claims. (Cl. 73—194)

The invention relates to fluid flow measurement and has as a general object to provide new and improved means for measuring flow of a fluid.

A more particular object is to provide new and improved means for establishing a pilot flow which, at all rates of flow, is directly proportional to the main flow to be measured and measuring the pilot flow to determine the flow of the main flow.

Still another object is to provide in a fluid supply system having an adjustable valve for varying the flow, means for maintaining constant the pressure differential across the valve, and means for determining the flow by measurement of a pilot flow including a valve mechanically actuated from the first mentioned valve and means for maintaining constant the pressure differential across the last mentioned valve.

Yet another object is to provide new and improved means for establishing a pilot flow which at all rates of flow is directly proportional to the main flow to be measured, and including means for measuring the pilot flow which is of such character that the resultant indication obtained is adjustable to match individual flow recorders or controllers.

Other objects and advantages will become apparent from the following detailed description taken in connection with the accompanying drawing, in which:

The figure is a diagrammatic showing of a system embodying the features of this invention.

While the invention is susceptible of various modifications and alternative constructions, it is shown in the drawing and will hereinafter be described in a preferred embodiment. It is not intended, however, that the invention is to be limited thereby to the specific construction disclosed. On the contrary, it is intended to cover all modifications and alternative constructions falling within the spirit and scope of the invention as defined in the appended claims.

In the exemplary embodiment of the invention shown diagrammatically in the drawing, 1 represents a conduit in a fluid supply system. The fluid flowing in the conduit 1 may be either a liquid or a gas, but is, for purposes of disclosure only, assumed to be a liquid such as oil, and it is, of course, supplied to the portion of the system shown in the drawing under pressure, the oil being received at the end 2 and discharged at the end 3 of the conduit 1. Interposed in the conduit so as to control the flow of oil therethrough is a valve 4 adjustable to various positions by means of a handle 5. Any one of several well known valves now on the market will serve as the valve 4, but for further definiteness it is stated that the valve 4 is of the "North American" type with an adjustable straight line plug opening.

In order that the flow in the conduit 1 may vary strictly in accordance with the degree of opening of the valve 4, a constant pressure differential across the valve 4 is maintained. To that end there is provided a differential pressure valve, generally designated 6. This valve comprises a casing 7 divided by a diaphragm 8 into a pair of chambers 9 and 10. The valve is so connected that the chamber 9 is in communication with the conduit 1 at a point ahead of the valve 4, while the chamber 10 is in communication with the conduit 1 at a point behind the valve 4, thereby subjecting the diaphragm to the pressures across the valve 4. Actuated by the diaphragm 8 is a valve element 11 adapted to cooperate with a valve seat 12 to control the pressure of the fluid ahead of the valve 4. The valve 6 is completed by means of a compression spring 13 interposed between the diaphragm 8 and an adjusting screw 14 by means of which the pressure differential across the valve 4 is initially adjusted.

It is frequently desirable or necessary that an indication of the rate or volume of flow of a fluid be obtained without direct measurement of the same. Means is provided herein for obtaining such indication in a simple and expedient manner. This means herein establishes a pilot flow which is directly proportional at all times to the rate of flow of the fluid that is to be measured, herein oil. To that end there is provided a conduit 15, hereinafter termed the pilot conduit, to which a pilot fluid, herein air, is supplied under pressure. Interposed in this conduit is a valve 16 which herein is identical in construction with the valve 4 and under any circumstances must be such as will enable the obtaining of various port openings directly proportional to those of the valve 4. In order that such port openings may be obtained with the greatest facility, it is desirable that the valves 4 and 16 be of identical construction. The valve 16 has an arm 17 for actuating the same. Where, as here, the valves 4 and 16 are of identical construction, port openings of the valve 16 directly proportional to the port openings of the valve 4 are readily and conveniently obtained by interconnecting the arms 5 and 17 mechanically, such as by link 18.

In order that the flow of the pilot fluid will be directly proportional to the flow of the main fluid when the valves 4 and 16 are, as here, adjusted to have port openings which are directly proportional, means is provided which maintains the pressure differential across the valve 16 constant regardless of its position. This means herein takes the form of a differential pressure valve, generally designated 19. This valve comprises a casing 20 which is divided by a diaphragm 21 into a chamber 22 and a chamber 23. The chamber 22 is connected to communicate with the conduit 15 ahead of the valve 16, while chamber 23 is by a pipe 24 connected to the conduit 15 behind the valve 16. The diaphragm 21 thus is subjected to the pressures aheads of and behind the valve 16, that is, the pressure across the valve. Actuated by the diaphragm 21 is a valve element 25 which cooperates with a valve seat 26 to determine the pressure ahead of the valve 16. Completing the valve 20 is a compression spring 27 interposed between the diaphragm 21 and an adjusting screw 28 for determining the pressure differential across the valve 16 which is to be maintained.

Having made the pilot flow directly proportional to the oil flow for all positions of the valve 4, means is next provided for measuring the pilot flow. To that end there is interposed in the conduit 15 beyond the valve 16 an orifice 29. Tapped into the conduit 15 on either side of the orifice 29 are conduits 30 leading to any suitable flow recording or controlling device which is responsive to pressure differentials. It being well known that the pressure differential across the orifice is proportional to the square of the air flow, in this case, inasmuch as the air flow has been made proportional directly to the oil flow, the pressure differential across the orifice 29 will also be proportional to the square of the oil flow. Preferably the orifice 29 is adjustable, thereby adapting the pressure differential reading obtained for use with a variety of flow recorders or controllers.

We claim as our invention:

1. Fluid flow measuring means comprising a first conduit for the flow therein under pressure of a main fluid whose flow is to be measured, a main valve in said conduit adjustable to vary the volume of flow therein, a second valve in said conduit upstream of said main valve, a differential pressure responsive device connected to be acted upon by the pressure on opposite sides of said main valve and controlling said second valve to maintain constant the pressure differential across said main valve for all positions thereof, and means for obtaining an indication of the flow of the main fluid without direct measurement thereof including a second conduit for the flow therein under pressure of a pilot fluid, a valve in said second conduit for controlling the flow therein, an operative connection between said main valve and said last named valve for adjusting said last named valve to maintain its port opening directly proportional at all times to that of said first named main valve, and a second valve in said second conduit upstream of the other valve in said second conduit and a differential pressure responsive device connected to be acted upon by the pressures on opposite sides of said other valve in said second conduit and controlling said second valve in said second conduit to maintain constant the pressure differential across said other valve in said second conduit for all positions thereof.

2. Fluid flow measuring means comprising a first conduit for the flow therein under pressure of a main fluid whose flow is to be measured, an adjustable valve in said conduit for controlling the flow therein, means for maintaining constant the pressure differential across said valve for all positions thereof including a differential pressure responsive valve comprising valve means positioned in said conduit upstream of said control valve to vary the pressure of the fluid supplied to said control valve and a pressure responsive device for actuating said valve means subjected to the pressure of the fluid in said conduit intermediate said valve means and said flow control valve and downstream of said flow control valve, and means for obtaining an indication of the flow of the main fluid without direct measurement thereof including a second conduit for the flow therein under pressure of a pilot fluid, a flow control valve in said second conduit, means for adjusting said last named valve to maintain its port opening directly proportional at all times to that of said first named valve, and means for maintaining constant the pressure differential across said last named valve for all positions thereof including a differential pressure responsive valve comprising valve means disposed in said second conduit upstream of said last mentioned flow control valve and pressure responsive means for actuating said last named valve means subjected to the pressure of the fluid in said second conduit intermediate said valve means and said flow control valve therein and downstream of said flow control valve therein.

3. Fluid flow measuring means comprising a first conduit for the flow therein under pressure of a main fluid whose flow is to be measured, a main valve in said first conduit adjustable to vary the volume of flow therein, a second valve in said conduit, a differential pressure responsive device connected to be acted upon by the pressure on opposite sides of said main valve and controlling said second valve to maintain constant the pressure differential across said main valve for all positions thereof, and means for obtaining an indication of the flow of the main fluid without direct measurement thereof including a second conduit wholly independently of said first conduit for the flow therein under pressure of a pilot fluid, a valve in said second conduit, an operative connection between said main valve and said last named valve for adjusting said last named valve to maintain its port opening at all times directly proportional to that of said main valve, and a differential pressure responsive device connected to be acted upon by the pressure on opposite sides of the valve in said second conduit and controlling the fluid flow in said second conduit to maintain constant pressure differential across said last named valve for all positions thereof.

4. Liquid flow measuring means comprising a first conduit for the flow therein under pressure of a liquid whose flow is to be measured, a valve in said first conduit adjustable to vary the volume flow therein, means connected with said first conduit and operating independently of further adjustment of said valve for maintaining constant the pressure differential across said valve for all positions thereof, and means for obtaining an indication of the flow of the liquid without direct measurement thereof including a second conduit independent of said first conduit for the flow therein under pressure of a gas, a valve in said second conduit, an operative connection between said first named and said last named valves for adjusting said last named valve to maintain its port opening at all times directly proportional to that of said first named valve, and a differential pressure responsive device connected to be acted upon by the pressure on opposite sides of the valve in said second conduit and controlling the flow of gas in said second conduit to maintain constant pressure differential across said last named valve for all positions thereof, and means connected to said second conduit for measuring the flow of gas in said second conduit.

5. Fluid flow measuring means comprising a first conduit for the flow therein under pressure of a main fluid whose flow is to be measured, a main valve in said first conduit adjustable to vary the volume of flow therein, means including a second valve in said conduit ahead of said main valve for maintaining constant the pressure differential across said main valve for all positions thereof, and means for obtaining an indication of the flow of the main fluid without direct measurement thereof including a second conduit for the flow therein under pressure of a pilot fluid, a valve in said second conduit, an operative connection between said main valve and said last named valve for adjusting said last named valve to maintain its port opening at all times directly proportional to that of said main valve, and a differential pressure responsive unit inserted within said second conduit operating to maintain constant the pressure differential across said last named valve for all positions thereof, and means for measuring the flow of pilot fluid in said second conduit including an adjustable orifice disposed in said second conduit beyond said valve therein.

6. Liquid flow measuring means comprising a first conduit for the flow therein under pressure of a liquid whose flow is to be measured, a main valve in said first conduit adjustable to vary the volume of flow therein, a second valve in said conduit, a differential pressure responsive device connected to be acted upon by the pressure on opposite sides of said main valve and controlling said second valve to maintain constant the pressure differential across said main valve for all positions thereof, and means for obtaining an indication of the flow of the liquid without direct measurement thereof including a second conduit for the flow therein under pressure of a gas, a valve in said second conduit, an operative connection for tying said main valve and said last named valve together to maintain directly proportional the port openings thereof in all positions of said main valve, and a differential pressure responsive device attached on both sides of the valve in said second conduit operating to maintain constant the pressure differential across said last named valve for all positions thereof.

7. Fluid flow measuring means comprising a first conduit for the flow therein under pressure of a main fluid whose flow is to be measured, an adjustable valve in said conduit for controlling the flow therein, means for maintaining constant the pressure differential across said valve for all positions thereof including a differential pressure responsive valve comprising valve means positioned in said conduit upstream of said control valve to vary the pressure of the fluid supplied to said control valve and a pressure responsive device for actuating said valve means subjected to the pressure of the fluid in said conduit intermediate said valve means and said flow control valve and downstream of said flow control valve, and means for obtaining an indication of the flow of the main fluid without direct measurement thereof including a second conduit for the flow therein under pressure of a pilot fluid, a flow control valve in said second conduit, means for adjusting said last named valve to maintain its port opening directly proportional at all times to that of said first named valve, and means for maintaining constant the pressure differential across said last named valve for all positions thereof including a differential pressure responsive valve comprising valve means disposed in said second conduit upstream of said last mentioned flow control valve and pressure responsive means for actuating said last named valve means subjected to the pressure of the fluid in said second conduit intermediate said valve means and said flow control valve therein and downstream of said flow control valve therein, and means for measuring the flow of gas in said second conduit including an adjustable orifice disposed in said second conduit beyond said valve therein.

JESSE JOHNSTON.
JOHN C. VAALER.

REFERENCES CITED

The following references are of record in the file of this patent:

UNITED STATES PATENTS

| Number | Name | Date |
|---|---|---|
| 1,240,325 | Earl | Sept. 18, 1917 |
| 1,264,553 | Pendleton | Apr. 30, 1918 |
| 1,891,035 | Young | Dec. 13, 1932 |
| 2,074,882 | Wunsch | Mar. 23, 1937 |
| 2,193,240 | Schmidt | Mar. 12, 1940 |
| 2,285,287 | Krogh | June 2, 1942 |